United States Patent Office 3,405,036
Patented Oct. 8, 1968

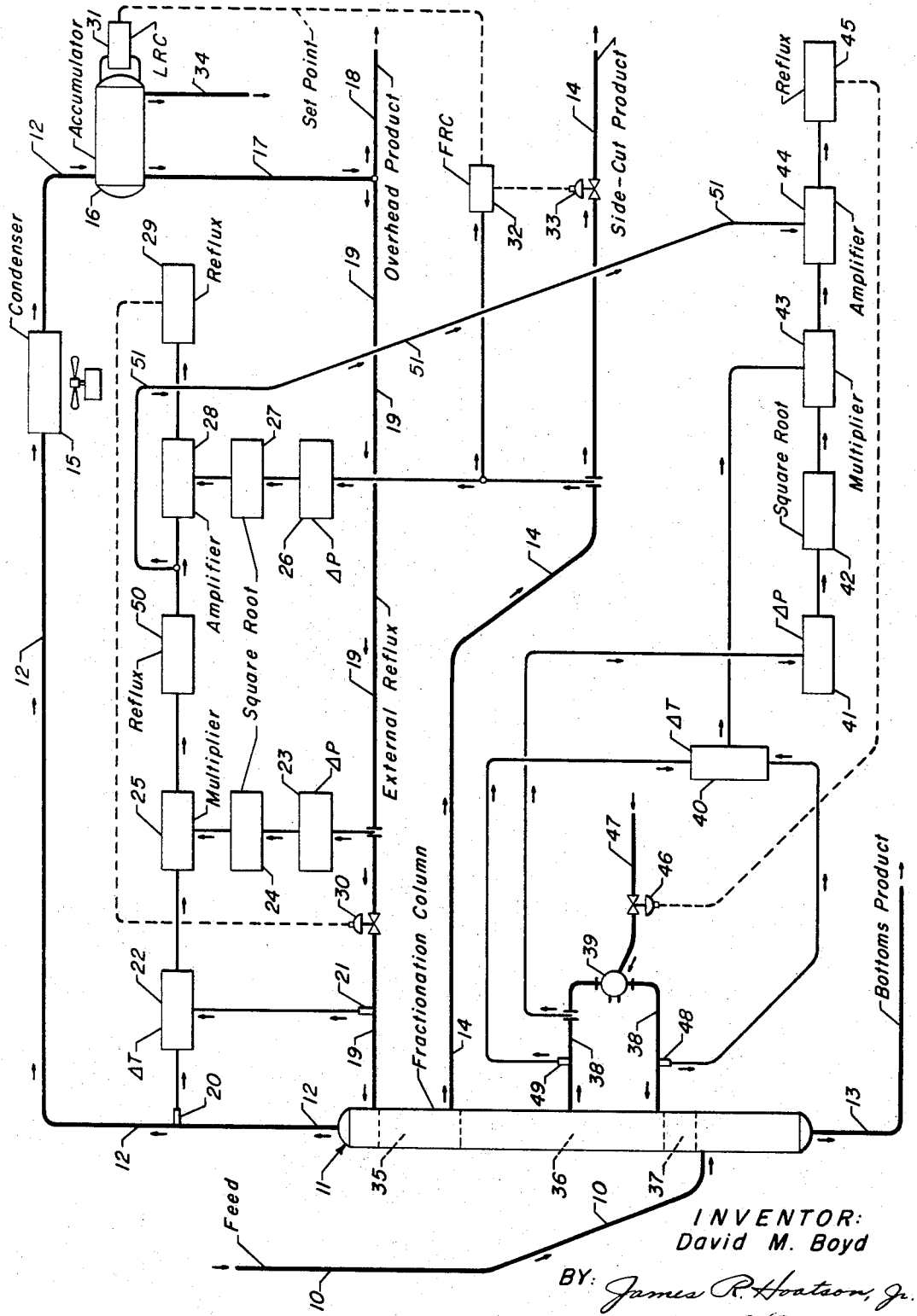

3,405,036
FRACTIONATOR SYSTEM WITH SIDE-CUT STREAMS AND INTERNAL REFLUX CONTROL
David M. Boyd, Clarendon Hills, Ill., assignor to Universal Oil Products Company, Des Plaines, Ill., a corporation of Delaware
Filed Oct. 23, 1967, Ser. No. 677,154
4 Claims. (Cl. 202—160)

ABSTRACT OF THE DISCLOSURE

Method and system for controlling a fractionation column. The system utilizes calculated internal reflux rate for control and is uniquely applicable to fractionation columns taking an overhead product stream, a bottoms product stream, at least one side-cut product stream, and has as part of the fractionation system a side-cut intercooler which removes fluid, cools such fluid, and returns the cool fluid directly to the tower as reflux at an intermediate location on the tower. The side-cut product flow rate and the heat loss of the returned, cooled fluid are taken into consideration in controlling the internal reflux in the column.

BACKGROUND OF THE INVENTION

This invention relates to control systems for regulating the operation of fractionation columns. It specifically relates to control systems for regulating a fractionating column wherein an overhead fraction, a bottoms fraction, at least one side-cut fraction and a side-cut intercooler is utilized. More particularly, the present invention relates to a control system which utilizes calculated internal reflux rate for control of fractionation efficiency in a distillation column.

It is well known in the prior art to separate fluid mixtures into individual component fractions according to boiling point differences utilizing fractionation means. These fractionation columns contain a number of contact devices, such as perforated plates, bubble cap plates, ceramic packing, and the like, in order to effectuate distillation. Typically, the fluid mixture to be separated is introduced into the column and heat is applied to the bottom of the column, usually by conventional reboiler means in order to vaporize the liquid. The lowest boiling constituents are obtained as an overhead product and the heaviest boiling constituents are obtained as a bottoms or residue product. In some cases, one or more intermediate boiling constituents are removed from the column as side-cut fractions. It is also conventional to return a portion of the condensed overhead material to the column as external reflux. Still further, it is also conventional in some cases to maintain the fractionation column in heat balance to use what is commonly called 'intercooling" which takes fluid (either vapor or liquid) from an intermediate portion of the tower, cools the fluid, and returns the cool fluid directly to the tower as a means of maintaining proper heat balance in unusually large fractionation columns. However, the chemical engineering tool of distillation is well known and is used extensively in the petroleum and chemical industries to separate fluid mixtures. Accordingly, a detailed résumé of the factors which go into fractionation of multicomponent mixtures will not be treated extensively in this specification.

Even though the principle of distillation is relatively simple and well understood, the operation of such a column is fraught with difficulty. For example, the column must be properly sized in order to provide space enough for proper contact between the various liquids and vapor streams within the column before effective separation can take place. Since commercial fractionating columns are generally large pieces of equipment, there is inherent in the operation of such columns a considerable time lag between changes in operating conditions and noticeable changes in result from such changed conditions. In other words, if there is a change in the feed temperature there is a considerable time lag involved before the effect of such change can be detected in a corresponding change in the composition of one or more product streams. Once the composition change has been detected, a correspondingly counter change is made in the flow rate of such stream in order to compensate for the change in feed temperature. This continuing cause and effect results in a rather unstable operation of the fractionating column and has prompted those skilled in the art to devise numerous control techniques for minimizing the instability of such columns.

Another significant difficulty in the operation of fractionating columns results from sudden changes in the ambient temperature surrounding the column which causes a corresponding abrupt change in the temperature of the overhead vapors from the column and/or the temperature of the external reflux being added to the top of the column. This difficulty has been magnified in recent years with the ever increasing use of fan coolers for condensing the overhead vapors. Sudden atmospheric temperature changes, such as occur during a rain storm for example, result in a sudden and significant lowering of the external reflux temperature. This causes an increase in the flow of liquid leaving the top tray because more of the vapor which enters this tray is condensed with a net result of increasing overhead product purity at the expense of a decreased overhead product rate.

Still another difficulty associated with the operation of fractionation columns is embodied in maintaining proper heat and material balances around the column. Most control systems are relatively effective in maintaining proper material balance so as to avoid an accumulation of too much material within the tower thereby causing "flooding" of the tower or the removal of too much material relative to the feed rate thereby causing the separation devices or fractionating trays to become dry for lack of proper liquid levels. However, in the control of temperature, the prior art systems have not been too effective. This difficulty of temperature control is immensely complicated with relatively tall fractionating towers containing, perhaps, from 25 to 300 fractionating trays which may sometimes be necessary to effectuate separation between relatively close boiling constituents. A considerable amount of heat must, therefore, be introduced either with the feed or with reboiler means in order to cause the vaporization of the lighter components away from the heavier components. But, in many instances, the large concentration of temperature or heat input into the lower portion of the column results in an undesirable increase in the heat level of the materials at intermediate locations in the tower. Accordingly, in some applications, it is desirable to use a liquid intercooler at some intermediate location on the tower. This operation removes heated fluid from one fractionating tray, passes it through cooling means such as a cooled water exchanger, and returns the cooled fluid to an intermediate portion of the tower, separated at least by one tray below the withdrawal point for the intercooled fluid. This means of removing sensible heat from the column (i.e., adjusting the amount of cooling of the withdrawn fluid) has resulted, however, in another factor for instability in fractionating columns in that the internal reflux at the point below the injection of the cool liquid becomes unknown due to the lack of proper knowledge concerning the degree to which sensible heat has been removed from the column.

Accordingly, it would be desirable to devise a control system to take into account changes in internal reflux rate due to the withdrawal of a product side-cut or to the utilization of side-cut intercoolers for the removal of sensible heat from the fractionating column.

The control of internal reflux has been found in the prior art by computing the amount of such reflux from a knowledge of the overhead vapor characteristics and from a knowledge of the external reflux which must be added to the top of any fractionating column in order for it to properly cause separation between the various boiling constituents contained in the feed mixture. Such a computation can be made from a measurement of the rate of flow of the external reflux and a measurement of the temperature differential between the external reflux returned to the column and a region near the top of the column such as the overhead vapor line. Signals representative of these two measurements are combined so as to provide a measurement of internal reflux in the column, particularly over that portion of the column immediately below the return point for the external reflux. Signals are also obtained for control purposes so as to maintain the internal reflux constant regardless of changes of external reflux rate and temperature.

However, this prior art internal reflux control system is not applicable to the control of fractionating columns which obtain side-cut fractions as product streams in addition to the conventional overhead system. This prior art internal reflux control system is also not applicable to the control of fractionating columns which utilize the side-cut intercooler means as a way of removing sensible heat from the fractionating column. In short, the prior art internal reflux computation means are not readily adaptable and cannot adequately control a fractionating column wherein at least one side-cut fraction is obtained as a product stream and/or a side-cut intercooler means is utilized to remove sensible heat from the column.

SUMMARY OF THE INVENTION

Accordingly, it is an object of this invention to provide improved fractionation column control systems which are based on internal reflux computation.

It is a further object of this invention to provide a fractionation column control system wherein the internal reflux is maintained constant at a predetermined or preselected value over segmented portions of the tower which have been influenced by side-cut product withdrawal and/or side-cut liquid intercooling techniques.

Therefore, according to the present invention, in a fractionation zone wherein a fluid mixture to be separated is introduced into a fractionation column through a first conduit; vapors are removed from the upper portion of said column through a second conduit; liquid is removed from the lower portion of said column through a third conduit; at least one fluid is removed from an upper intermediate portion of said column through at least a fourth conduit; another fluid is removed from a lower intermediate portion of said column through a fifth conduit, cooled and returned to said column at an intermediate locus; said vapors are at least partially condensed, and at least a portion of the condensate is returned to said column as external reflux through a sixth conduit, a control system for maintaining the internal reflux in said column substantially constant at a predetermined value which comprises: (a) first means to establish a first signal functionally representing the quantity $[R_e(1+K\Delta T)]$ wherein $R_e$ represents the rate of flow of fluid in said sixth conduit, K is a constant and $\Delta T$ is the difference in temperature of fluids in said second and sixth conduits; (b) second means to establish a second signal representing the rate of flow in said fourth conduit; (c) third means for subtracting the quantity represented by said second signal from the quantity represented by said first signal thereby producing a third signal; (d) fourth means to establish a fourth signal functionally representing the quantity $[R_{e_1}(1+K_1\Delta T_1)]$ wherein $R_{e_1}$ represents the rate of flow of fluid in said fifth conduit, $K_1$ is a constant, and $\Delta T_1$ is the difference in temperature of the fluid in said fifth conduit removed from the column and returned to said column; (e) fifth means for adding the quantity represented by said fourth signal to the quantity represented by said third signal; and, (f) sixth means responsive to said fifth means to adjust the amount of cooling of the fluid in said fifth conduit.

Additionally, according to the present invention, in a fractionation zone wherein a fluid mixture to be separated is introduced into a fractionation column through a first conduit; vapors are removed from the upper portion of the column through a second conduit; liquid is removed from the lower portion of said column through a third conduit; a fluid is removed from an intermediate portion of said column through a fourth conduit, cooled and returned to said column at an intermediate locus; said vapors are at least partially condensed and, at least a portion of the condensate is returned to said column as external reflux through a fifth conduit, a control system for maintaining the internal reflux in said column substantially constant at a predetermined value which comprises: (a) first means to establish a first signal functionally representing the quantity $[R_e(1+K\Delta T)]$ wherein $R_e$ represents the rate of flow of fluid in said fifth conduit, K is a constant, and $\Delta T$ is the difference in temperature of fluids in said second and said fifth conduits; (b) second means to establish a second signal functionally representing the quantity $[R_{e_1}(1+K\Delta_1 T_1)]$ wherein $R_{e_1}$ represents the rate of flow of fluid in said fourth conduit, $K_1$ is a constant, and $\Delta T_1$ is the difference in temperature of the fluid in said fourth conduit removed from said column and returned to said column; (c) third means for adding the quantity represented by said first signal to the quantity represented by said second signal thereby producing a third signal; (d) fourth means responsive to said first signal to adjust the rate of flow in said fifth conduit; and, (e) fifth means responsive to said third signal to adjust the amount of cooling of the fluid in said fourth conduit.

Thus, it can be seen from the above embodiments that the present invention provides substantial improvements on the prior art control systems by adjusting the internal reflux calculation for the withdrawal of a side-cut product stream and/or the utilization of a side-cut intercooler for the removal of sensible heat from the column. It is to be noted that for the side-cut withdrawal rate the calculation for the internal reflux rate at the top of the column is compensated for by subtracting from the output signal of the internal reflux calculation a quantity representative of the rate of flow of the withdrawal of the side-cut product. On the other hand, the internal reflux calculation at the top of the column is adjusted by adding to the calculated internal reflux, the calculated internal reflux which would result from the removal of the sensible heat utilizing a side-cut intercooler. It is to be further noted that if a side-cut product is used and an intercooler is used the calculation in the first instance is compensated by a subtraction scheme and the net result from the subtracting operation is then added to the calculated internal reflux rate resulting from the removal of the sensible heat from the column. By operating in this manner, the internal reflux rate for any segmented portion of a fractionating column can be maintained substantially constant at a predetermined value. Such operation provides excellent control over the operation of the fractionating column thereby causing increased operating efficiencies in terms of improved separation efficiencies and improved desired product recovery factors.

As used herein, the term "internal reflux" is intended to include the amount of external reflux returned to the column plus the amount of vapor which is condensed near the top of the column by the supercooled external liquid less the amount of product withdrawal and/or plus the amount of external reflux returned to the column at an intermediate locus resulting from the use of an intercooler. Those skilled in the art know well from general knowledge and the teachings presented herein that if the internal reflux is maintained constant at the top of the fractionating column then the internal reflux step by step down the column will similarly be maintained constant assuming constant molal overflow as long as proper compensation is maintained for either product withdrawal rate and/or sensible heat removal schemes. It is important to note that the area of actual control within the fractionating column contemplated by the present invention is that selected area between those points of the column which have been acted upon to upset equilibrium conditions. For example, the internal reflux is of importance in that area between the feed introduction point and the sensible heat withdrawal section of the column. Similarly, the internal reflux is important in that area of the column between the area for sensible heat removal and the side draw-off conduit in question. Still further, the internal reflux is of interest near the top of the column immediately below the return point for the normal reflux and includes that point between such reflux return and, for example, the side draw-off conduit in question. The internal reflux calculation as contemplated by the present invention, in each selected area of the column, is of course by no means to be construed as being equal in each area. It is important, however, that the internal reflux in each selected area of interest be maintained substantially constant at a preselected value in order for stability of fractionating column operation to be achieved.

By way of comparison, the prior art schemes were not flexible enough to take care of the condition for either an additional side-cut product stream or for the inclusion of a sensible heat removal scheme. For example, in the prior art schemes, if the amount of side-cut product is increased, the internal reflux computer has no way of knowing how to compensate for this withdrawal of material and, accordingly, the internal reflux would correspondingly change in response to a temperature change at the top of the column. However, the time lag involved between the temperature change detected at the top of the column and the actual change in the withdrawal rate of the side-cut product would be so great as to render the fractionating column unstable and therefore generally unsuitable for most commercial practices which would remove a side-cut product from a fractionating column. Accordingly, it can be seen that the present invention provides a method whereby a change in the withdrawal rate of a side-cut product results in an immediate change in the rate of external reflux added so that the internal reflux within the column is thereby maintained substantially constant at a predetermined value regardless of changes in the side-cut product withdrawal rate. In this respect, of course, the internal reflux of interest is in that area of the tower immediately below the side-cut product withdrawal conduit. In short, therefore, the practice of the present invention provides stability of operation not readily achievable by the control schemes of the prior art.

The invention may be readily understood from the following detailed description which is presented in conjunction with the accompanying drawing which is a schematic representation of apparatus for the practice of one embodiment of this invention.

DESCRIPTION OF THE DRAWING

Referring now to the drawing, there is shown a conventional fractionating column 11 which is provided with a number of vapor-liquid contact trays, not shown. It is desired for purposes of this description to maintain the internal reflux within the areas shown as 35, 36 and 37 substantially constant at some predetermined value under the conditions imposed for fractionation. A suitable feed mixture to be separated into individual product streams is introduced into fractionating column 11 via line 10. Sufficient heat is supplied to the column for fractionation purposes by suitable reboiler means, not shown. An overhead vapor fraction comprising one product stream is withdrawn via line 12. A liquid bottoms product stream is withdrawn from the lower portion of column 11 via line 13. As an additional feature in the practice of this invention, at least one side-cut product stream is withdrawn from an intermediate location via line 14, such location being at the top of one area where it is desired to maintain the internal reflux constant. Additionally, means are provided for removing sensible heat from the column by withdrawing a vapor (or liquid) stream via line 38 through cooler 39 and returning the cool fluid to the tower. For a preferred embodiment of this invention, the cooled fluid leaving cooler 39 is returned to the column one tray beneath the withdrawal tray from which the liquid was removed via line 38. Sufficient coolant is added to cooler 39 via line 47, the amount of which being controlled by control valve 46, the details of which are more fully developed hereinafter.

The overhead vapors from the column in line 12 are condensed in fan cooler 15 and the resulting liquid therefrom is accumulated in vessel 16. The condensate is removed via line 17 and at least a portion of this condensate is returned via line 19 to column 11 as external reflux to the top portion of the column. If desired, a net overhead product stream may be withdrawn from the system via line 18. Additionally, a contaminant product, such as water, may be withdrawn from accumulator 16 via line 34.

The amount of condensate in accumulator 16 is measured by level recorder-controller 31 which in a preferred embodiment activates control valve 33 via flow recorder-controller 32 to maintain and control the rate of withdrawal of the side-cut product stream in line 14.

For an understanding of the invention, a simplified calculation will be presented for showing the mechanism of determining the internal reflux in the various segments of fractionating column 11. The calculation of the internal reflux at the top of the column within the area 35 is calculated by the well known heat and material balances across a given section of the column, in this instance the top tray of fractionator 11. Therefore, the material balance at the top of the fractionator can be expressed:

$$R_e + V_i = R_i + V_o \tag{1}$$

where:

$R_e$ = mass flow of liquid entering top tray (external reflux),
$V_i$ = mass flow of vapor entering top tray,
$R_i$ = mass flow of liquid leaving top tray (internal reflux),
$V_o$ = mass flow of vapor leaving top tray.

The heat balance at the top tray can be expressed:

$$R_e h_e + V_i H = R_i h_i + V_o H \tag{2}$$

where:

$h_e$ = enthalpy of external reflux,
$h_i$ = enthalpy of internal reflux,
$H$ = enthalpy of vapor streams (assumed to be equal).

The enthalpy of the vapor streams entering and leaving the top tray can be expressed:

$$H = h_i + \tau \tag{3}$$

where $\tau$ is the heat of vaporization of liquid on the tray.

The enthalpy of the external reflux can be expressed:

$$h_e = h_i - C_p \Delta T \tag{4}$$

where:

$C_p$ = specific heat of the external reflux,
$\Delta T$ = the difference in temperature between the top tray and external reflux.

Equation 3 can be substituted into Equation 2 to eliminate H and rewritten:

$$V_i(h_i + \tau) - V_o(h_i + \tau) = R_i h_i - R_e h_e \tag{5}$$

Equation 4 can be substituted into Equation 5 to eliminate $h_e$ and rewritten:

$$(h_1+\tau)(V_1-V_o)=h_i(R_i-R_e)+R_eC_p\Delta T \qquad (6)$$

From Equation 1 it is known:

$$V_1-V_o=R_i-R_e \qquad (7)$$

Equation 7 can be substituted into Equation 6 and reduced to obtain:

$$(8)$$

$$R_i=R_e\left(1+\frac{C_p\Delta T}{\tau}\right)$$

Equation 8 can be modified by substituting a constant K for:

$$C_p/\tau$$

and substituting in Equation 8 to obtain:

$$R_i=R_e(1+K\Delta T) \qquad (9)$$

In order to solve Equation 9 a differential pressure transmitter 23 is connected across an orifice in conduit 19 to establish a signal which is representative of the differential pressure across the orifice. The signal is applied to the input of a means 24 for establishing an output signal representative of the square root of the input signal. The output signal of means 24 which is thus representative of the flow $R_e$ through conduit 19 is applied to the first input of a multiplier 25. A first thermocouple 21 is disposed in conduit 19 and a second thermocouple 20 is disposed in conduit 12. These two thermocouples are connected to the input of a transducer which establishes a signal representative of the difference between the two temperatures sensed by the two thermocouples. As previously mentioned, since K is a constant, means 22 now calculates the term "$(1+K\Delta T)$" and develops an output signal therefrom. This signal is applied to the second input of multiplier 25. The output signal from multiplier 25 is thus equal to the term "$R_i$" of Equation 9.

However, as previously mentioned, a side-cut product fraction is being withdrawn via line 14 in accordance with the control demands of LRC 31. Accordingly, the rate of a side-cut product withdrawal $R_s$ must be taken into account. A differential pressure transmitter 26 is connected across an orifice in line 14 to establish a signal which is representative of the differential pressure across the orifice. This signal is supplied to the input means 27 for establishing an output signal representative of the square root of the input signal. The output signal of means 27 which is thus representative of the flow $R_s$ through conduit 14 is applied to the first input of a summing amplifier 28. As previously mentioned, the output signal from multiplier 25 is now applied to the second input of summing amplifier 28. The calculations performed by amplifier 28 results in the subtraction of the quantity $R_s$ from the quantity represented by the signal from multiplier 25, thereby establishing a signal from amplifier 28 representing the solution to the following equation:

$$R_{i_L}=R_e(1+K\Delta T)-R_s \qquad (10)$$

wherein $R_{i_L}$ is the internal reflux in area 35.

The solution to Equation 10 represents a signal which provides input to flow recorder controller 29 which in turn activates control 30 for adjusting the rate of external reflux flowing in conduit 19.

In actual operation, therefore, if the rate of withdrawal of side-cut product in line 14 increases, appropriate calculations will be made so that there will be a corresponding immediate increase in the amount of external reflux added to the column via line 19. Conversely, if the rate of side-cut product withdrawal is decreased there will be a corresponding immediate decrease in the amount of external reflux being added via line 19. The net effect of this system, therefore, is to maintain the rate of internal reflux within the column at a predetermined substantially constant value.

Still further, as previously mentioned, a vapor stream is withdrawn via line 38, cooled (or condensed) in intercooler 39 and returned to the column, preferably, at an intermediate locus of at least one fractionator tray below the chosen liquid withdrawal tray. Accordingly, the amount of sensible heat removed from the column must now be taken into account if the internal reflux $R_{i_m}$ is to be maintained constant in area 37. A differential pressure transmitter 41 is connected across an orifice in line 38, preferably, upstream of cooler 39 to establish a signal which is representative of the differential pressure across the orifice. This signal is supplied to the input means 42 for establishing an output signal representative of the square root of its input signal. The output signal of means 42 is thus representative of flow $R_{e_1}$ through conduit 38.

Thermocouple means 49 is disposed in conduit 38 at a locus upstream of intercooler 39 and thermocouple means 48 is similarly disposed at a locus downstream of cooler 39. These two thermocouples are connected to the input of a transducer which establishes a signal representative of the difference between the temperatures sensed by thermocouples 49 and 48.

Since $K_1$ is also a constant, means 40 now calculates the term "$(1+K_1\Delta T_1)$" and develops an output signal therefrom. This signal is applied to one input of multiplier 43. The signal from means 42 is applied to another input of multiplier 43. The output signal from multiplier 43 thus solves the equation:

$$R_{i_x}=[R_{e_1}(1+K_1\Delta T_1)] \qquad (11)$$

wherein:

$R_{i_x}$ is the internal reflux in area 37 without taking into account the internal reflux generated from the top of the column; namely, area 36. Therefore, the internal reflux $R_{i_m}$ for area 37 is represented by the equation:

$$R_{i_m}=R_{i_1}+R_{i_x} \qquad (12)$$

Accordingly, the output signal from amplifier 28 is introduced into amplifier 44 together with the signal from multiplier 43. The output signal from amplifier 44 represents the solution to Equation 12.

It is to be noted that Equation 11 was developed by taking a vapor product from the column via line 38. The invention also embodies the removal of a liquid stream via line 38 and in some cases it may be preferable to do so.

Accordingly, the term "functionally representing" as applied to this calculation herein and in the claims is intended to be broad enough to embody the liquid stream or vapor stream withdrawal situation in line 38 and the claims are not be limited to either situation.

If desired, the solution to Equation 12 develops a signal which provides input to the controller in intercooler circuit 38–39, such as control valve 46 to adjust the rate of flow of coolant in line 47, as previously mentioned, or to adjust the flow of fluid in conduit 38 by suitable means, not shown. Both of these adjusting schemes are applicable for controlling internal reflux in Equation 11 via adjustment of the amount of cooling of the fluid in conduit 38, using output signal from amplifier 44.

As a preferred embodiment, readout means or recorder means 50, 29, and 45 are supplied to show the internal reflux quantity being maintained in areas 35, 36, and 37, respectively, of column 11.

Another embodiment of this invention includes the system wherein valve means 33 is closed thereby indicating that no side-stream product is being withdrawn from column 11 via conduit 14. Since it is still desirable to maintain the internal reflux in area 37 substantially constant at a predetermined value, the following equation must be solved:

$$R_{i_m}=R_i+R_{i_x} \qquad (13)$$

Thus, to solve Equation 13, the output signal from multiplier 25 and/or readout means 50 is supplied directly as input to amplifier 44 using by-pass lead 51. As previously mentioned, the other input to amplifier 44 is the signal from multiplier 43.

In the latter embodiment, readout means 50 and 29 will be the same, or may be by-passed by means not shown. In either event, the output signal from multiplier 25 is used to control valve 30 for adjusting the rate of flow of external reflux in conduit 19.

The components of the control system are well known to those skilled in the art from the teachings presented herein and from general knowledge. The various transmitters, transducers, square root means, multipliers, controllers, accumulators, etc. are available commercially from any number of reputable instrument manufacturers.

PREFERRED EMBODIMENT

Therefore, from the foregoing, a preferred embodiment of the present invention includes the previous embodiments presented hereinabove wherein the control system is further characterized by seventh means responsive to said fifth means to adjust the $\Delta T_1$ in said fifth circuit.

Additional preferred embodiments include the control system previously disclosed further characterized by means responsive to the rate of accumulation of said condensate to adjust the rate of flow of fluid through said fourth conduit.

Each of the above preferred embodiments are characterizing the system whereby a side-cut product is withdrawn from the system.

The invention claimed is:

1. In a fractionation system wherein a fluid mixture to be separated is introduced into a fractionation column through a first conduit; vapors are removed from the upper portion of said column through a second conduit; liquid is removed from the lower portion of said column through a third conduit; at least one fluid is removed from an upper intermediate portion of said column through at least a fourth conduit; vaporous fluid is removed from a lower intermediate portion of said column through a fifth conduit, cooled and returned to said column at an intermediate locus; said vapors from the upper portion of said column are at least partially condensed, and at least a portion of the condensate is returned to said column as external reflux through a sixth conduit, a control system for maintaining the internal reflux in said column substantially constant at a predetermined value which comprises:

(a) first means to establish a first signal functionally representing the quantity $[R_e(1+K\Delta T)]$ wherein $R_e$ represents the rate of flow of fluid in said sixth conduit, K is a constant, and $\Delta T$ is the difference in temperature of fluids in said second and sixth conduits;
   (b) second means to establish a second signal representing the rate of flow of fluid in said fourth conduit;
   (c) third means for subtracting the quantity represented by said second signal from the quantity represented by said first signal thereby producing a third signal;
   (d) fourth means to establish a fourth signal functionally representing the quantity $[R_{e_1}(1+K_1\Delta T_1)]$ wherein $R_{e_1}$ represents the rate of flow of fluid in said fifth conduit, $K_1$ is a constant, and $\Delta T_1$ is the difference in temperature of the fluid in said fifth conduit removed from said column and returned to said column;
   (e) fifth means for adding the quantity represented by said fourth signal to the quantity produced by said third signal; and,
   (f) sixth means responsive to said fifth means to adjust the amount of cooling of the fluid in said fifth conduit.

2. Control system according to claim 1 further characterized by seventh means responsive to said fifth means to adjust the $\Delta T_1$ in said fifth conduit.

3. Control system according to claim 1 further characterized by means responsive to the rate of accumulation of said condensate to adjust the rate of flow of fluid through said fourth conduit.

4. In a fractionation system wherein a fluid mixture to be separated is introduced into a fractionation column through a first conduit; vapors are removed from the upper portion of the column through a second conduit; liquid is removed from the lower portion of said column through a third conduit; a fluid is removed from an intermediate portion of said column through a fourth conduit, cooled, and returned to said column at an intermediate locus; said vapors from the upper portion of said column are at least partially condensed; and, at least a portion of the condensate is returned to said column as external reflux through a fifth conduit, a control system for maintaining the internal reflux in said column substantially constant at a predetermined value which comprises:

(a) first means to establish a first signal representing the quantity $[R_e(1+K\Delta T)]$ wherein $R_e$ represents the rate of flow of fluid in said fifth conduit, K is a constant, and $\Delta T$ is the difference in temperature of fluids in said second and said fifth conduits;
   (b) second means to establish a second signal representing the quantity $[R_{e_1}(1+K_1\Delta T_1)]$ wherein $R_{e_1}$ represents the rate of flow of fluid in said fourth conduit, $K_1$ is a constant, and $\Delta T_1$ is the difference in temperature of the fluid in said fourth conduit removed from said column and returned to said column;
   (c) third means for adding the quantity represented by said first signal to the quantity represented by said second signal thereby producing a third signal;
   (d) fourth means responsive to said first signal to adjust the rate of flow in said fifth conduit; and,
   (e) fifth means responsive to said third signal to adjust the amount of cooling of the fluid in said fourth conduit.

References Cited

UNITED STATES PATENTS

| | | | |
|---|---|---|---|
| 2,476,010 | 7/1949 | Whittlesey | 208—358 |
| 2,534,870 | 12/1950 | Kraft | 208—358 |
| 3,020,213 | 2/1962 | Lupfer | 196—132 |
| 3,212,997 | 10/1965 | Walker | 203—2 |
| 3,331,753 | 7/1967 | Foester et al. | 203—2 |
| 3,365,386 | 1/1968 | Van Pool | 196—132 |

WILBUR L. BASCOMB, Jr., *Primary Examiner.*